United States Patent
Tsuchida et al.

(10) Patent No.: US 8,958,927 B2
(45) Date of Patent: Feb. 17, 2015

(54) VEHICLE-ONBOARD APPARATUS SYSTEM, PORTABLE TERMINAL, AND VEHICLE-ONBOARD MACHINE

(71) Applicant: Clarion Co., Ltd., Saitama-shi, Saitama (JP)

(72) Inventors: Gen Tsuchida, Tokyo (JP); Hideki Takano, Tokyo (JP); Yoshiteru Takeshima, Tokyo (JP); Kunihiko Toumura, Tokyo (JP); Haruhiko Sawajiri, Saitama (JP); Kyosuke Tsurusu, Saitama (JP)

(73) Assignee: Clarion Co. Ltd., Saitama-shi (JP)

( * ) Notice: Subject to any disclaimer, the term of this patent is extended or adjusted under 35 U.S.C. 154(b) by 0 days.

(21) Appl. No.: 14/186,672

(22) Filed: Feb. 21, 2014

(65) Prior Publication Data
US 2014/0288728 A1 Sep. 25, 2014

(30) Foreign Application Priority Data
Mar. 21, 2013 (JP) .................. 2013-057980

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| G07C 5/00 | (2006.01) | |
| G06F 11/07 | (2006.01) | |

(52) U.S. Cl.
CPC ............ *G07C 5/008* (2013.01); *G06F 11/0739* (2013.01)
USPC .................................................. 701/1

(58) Field of Classification Search
CPC ....................................................... G07C 5/008
USPC .......................................................... 701/1
See application file for complete search history.

(56) References Cited

U.S. PATENT DOCUMENTS

| | | | |
|---|---|---|---|
| 2011/0276313 A1 | 11/2011 | Inaba | |
| 2012/0128267 A1 | 5/2012 | Dugan et al. | |

FOREIGN PATENT DOCUMENTS

| | | |
|---|---|---|
| EP | 1 562 119 A1 | 8/2005 |
| EP | 2 387 005 A2 | 11/2011 |
| EP | 2 387 005 A3 | 11/2011 |
| JP | 2003-228498 | 8/2003 |
| JP | 2005-275753 A | 10/2005 |
| JP | 2009-253564 A | 10/2009 |

OTHER PUBLICATIONS

European Patent Office extended search report on application 14156030.0 dated Jun. 25, 2014; 7 pages.

*Primary Examiner* — Maceeh Anwari
(74) *Attorney, Agent, or Firm* — Foley & Lardner LLP

(57) ABSTRACT

A vehicle-onboard apparatus system, comprises a portable terminal and a vehicle-onboard machine that are configured to be coupled to each other for communication. The portable terminal and the vehicle-onboard machine each store operation logs including operation contents thereof. When an operation of the vehicle-onboard machine and an operation of the portable terminal relate to each other, an operation log resulting from the operation of the vehicle-onboard machine and an operation log resulting from the operation of the portable terminal are associated with each other by first identification information. The vehicle-onboard machine makes a user to recognize the first identification information corresponding to an operation causing detected predetermined state. When the portable terminal receives an input of the first identification information presented by the vehicle-onboard machine, the portable terminal acquires the operation log associated with the input first identification information. The portable terminal analyzes the acquired operation log.

10 Claims, 11 Drawing Sheets

ERROR INFORMATION REFERENCE TABLE

150

| VEHICLE-ONBOARD MACHINE ERROR CODE (151) | PROCESSING IDENTIFIED BY INPUT TRANSACTION ID (152) | RECOVERY COUNTERMEASURE MESSAGE (153) |
|---|---|---|
| XX-XXX-0001 | NO LOG IDENTIFIED BY INPUT TRANSACTION ID | RECONSIDER USB COMMUNICATION SETTING |
| | COMMUNICATION IS NOT FINISHED | CHECK WHETHER USB CABLE IS DISCONNECTED OR NOT |
| XX-XXX-0002 | COMMUNICATION IS NOT FINISHED | CHECK WHETHER USB CABLE IS DISCONNECTED OR NOT |

YYYYMMDDhhmmss: connection aborted (TransactionID: xxxxx-yyyyz)
YYYYMMDDhhmmss: connection timeout (TransactionID: xxxxx-yyyyy) — 161

*Fig. 12*

VEHICLE-ONBOARD APPARATUS SYSTEM, PORTABLE TERMINAL, AND VEHICLE-ONBOARD MACHINE

CLAIM OF PRIORITY

The present application claims priority from Japanese patent application JP 2013-57980 filed on Mar. 21, 2013, the content of which is hereby incorporated by reference into this application.

BACKGROUND OF THE INVENTION

This invention relates to a vehicle-onboard apparatus system in which a vehicle-onboard machine such as a navigation apparatus and a portable terminal such as a smartphone are coupled to each other for communication.

In the vehicle-onboard apparatus system including the vehicle-onboard machine and the portable terminal coupled to the vehicle-onboard machine for communication, there is proposed a form in which various services are provided for the vehicle-onboard machine from a service provider server installed at a different location from a vehicle. The vehicle-onboard machine is an apparatus installed on a passenger vehicle or a commercial vehicle, and includes a navigation apparatus for guiding a route to a destination, and an apparatus for using a telematics service. The portable terminal includes a smartphone.

In such a system, the vehicle-onboard machine can use various services provided by the service provider server by communicating, via communication lines (carrier networks) of a portable phone, data to/from the server.

As the smartphone becomes popular, there is conceivable such a form in which an application provided by the service provider is downloaded on the smartphone, and the downloaded application is used by the vehicle-onboard machine coupled to the smartphone. In this application form, the smartphone acquires data via the carrier network from the server and outputs the acquired data to the vehicle-onboard machine, and then the vehicle-onboard machine displays the data. It should be noted that, in this application form, a service provider may prepare the vehicle-onboard machine, or the service provider may provide a development environment for the vehicle-onboard machine.

If a certain failure occurs on the vehicle-onboard machine or on the portable terminal, which is considered as a client side with respect to the service provider in this application form, the user may make a telephone call to a call center of the service provider, and consult about the occurred failure. However, the call center side has difficulty in recognizing the event occurred to the client side by means of the consultation over the telephone.

Thus, a method of causing the portable terminal or the vehicle-onboard machine to record an operation log representing an own operation, and analyzing the operation log after a failure occurs, and a method of displaying a message including a content of the failure and a handling method for the failure on the vehicle-onboard machine or the portable terminal when a failure occurs are conceivable.

For example, in Japanese Patent Application Laid-open No. 2009-253564, there is a description that an apparatus "includes a log accumulation part 29 for accumulating a log including an ID for identifying an event, an ID list storage part 28 for storing an ID list in which the ID of the event is specified, an acquisition control part 22 for identifying one ID list out of the storage of the ID list storing part 28 by analyzing a transmitted log acquisition request, a log extraction part 23 for extracting a log including the ID specified in the identified ID list, and a log information transmission part 25 for transmitting log information including the extracted log to a log acquisition request transmission source."

Moreover, in Japanese Patent Application Laid-open No. 2005-275753, there is a description that "A vehicle-onboard system of this invention includes a vehicle-onboard apparatus 10 to be installed on a vehicle so as to communicate to/from a road-side apparatus installed on a road side in an electronic toll collection (ETC) system and a navigation apparatus 20 to be installed on the vehicle, which are coupled to each other for communication. If abnormality relating to the vehicle-onboard apparatus 10 occurs, the vehicle-onboard apparatus 10 notifies the navigation apparatus 20 of an error code representing a type of the occurred abnormality. On the other hand, the navigation apparatus 20 stores, in a storage part 23, messages each representing a content of each error code and a handling method for an error, and displays, on a display part 27, a message corresponding to the error code notified by the vehicle-onboard apparatus 10. Thus, the content of the occurred error and the handling method can be immediately recognized by an occupant of the vehicle."

SUMMARY OF THE INVENTION

In a vehicle-onboard apparatus system in which a vehicle-onboard machine and a portable terminal cooperate with each other to access to a service provider server, when a failure occurs on a client side, a system for associating information on the vehicle-onboard machine and information on the portable terminal with each other, analyzing operation logs, and displaying a message including a content of the failure and a handling method for the failure is necessary. However, it is difficult for the related art to associate the information on the vehicle-onboard machine and the information on the portable terminal with each other when a failure occurs particularly on the vehicle-onboard machine or on a coupling between the vehicle-onboard machine and the portable terminal.

Japanese Patent Application Laid-open No. 2009-253564 discloses a technology involving controlling an apparatus to acquire a log generated by another apparatus. However, a log which can be extracted by using an ID of a log generated on a certain apparatus is only a log generated by this apparatus in the technology disclosed in Japanese Patent Application Laid-open No. 2009-253564. Therefore, for example, it is difficult to extract a log of the portable terminal by using an ID of a log generated by the vehicle-onboard machine.

Japanese Patent Application Laid-open No. 2005-275753 discloses a technology involving displaying, when a failure occurs on a vehicle-onboard apparatus, information on the failure of the vehicle-onboard apparatus on the navigation apparatus, thereby controlling a plurality of apparatus to cooperate with each other against the failure. However, it is not assumed that the log of the navigation apparatus is analyzed by means of an error code of the vehicle-onboard machine, and it is difficult to analyze the failure by associating the information on the plurality of apparatus.

This invention has been made in view of the above-mentioned problems, and therefore has an object to provide a vehicle-onboard apparatus system including a vehicle-onboard machine and a portable terminal that cooperate with each other to access to a service provider server, which is capable of analyzing, when a failure occurs on the vehicle-onboard machine or on a coupling between the vehicle-onboard machine and the portable terminal, the failure by associating information displayed on the vehicle-onboard machine and operation logs stored in the portable terminal.

According to an aspect of the present invention, there is provided a vehicle-onboard apparatus system, comprising a portable terminal and a vehicle-onboard machine that are configured to be coupled to each other for communication, wherein: the portable terminal and the vehicle-onboard machine each store operation logs including operation contents thereof; in a case where an operation of the vehicle-onboard machine and an operation of the portable terminal relate to each other, an operation log resulting from the operation of the vehicle-onboard machine and an operation log resulting from the operation of the portable terminal are associated with each other by first identification information; in a case where the vehicle-onboard machine detects that one of coupling between the portable terminal and the vehicle-onboard machine and the vehicle-onboard machine enters a predetermined state, the vehicle-onboard machine is configured to make a user to recognize the first identification information corresponding to an operation causing the detected predetermined state; and the portable terminal is configured to: acquire, in a case where the portable terminal receives an input of the first identification information recognized by the user, the operation log associated with the input first identification information out of the operation logs stored in the portable terminal; and analyze the acquired operation log.

A brief description is now given of effects provided by the exemplary embodiment of this invention disclosed in this application. This invention enables to provide a vehicle-onboard apparatus system including a vehicle-onboard machine and a portable terminal that cooperate with each other to access to a service provider server, which is capable of analyzing, when a failure occurs on the vehicle-onboard machine or on a coupling between the vehicle-onboard machine and the portable terminal, the failure by associating information displayed on the vehicle-onboard machine and operation logs stored in the portable terminal.

A brief description is now given of an effect provided by representative embodiments of this invention disclosed in this application.

BRIEF DESCRIPTION OF THE DRAWINGS

The present invention can be appreciated by the description which follows in conjunction with the following figures, wherein:

FIG. 11 is an explanatory diagram of an error information reference table according to the embodiment of this invention;

FIG. 12 is an explanatory diagram of an operation log stored in the smartphone according to the embodiment of this invention;

DETAILED DESCRIPTION OF THE PREFERRED EMBODIMENT

A detailed description is now given of an embodiment of this invention referring to drawings. Substantially like components are denoted by like numerals, and a description thereof is therefore omitted.

In the following, a description is given of the embodiment of this invention referring to FIGS. 1 to 17.

Figure 1:
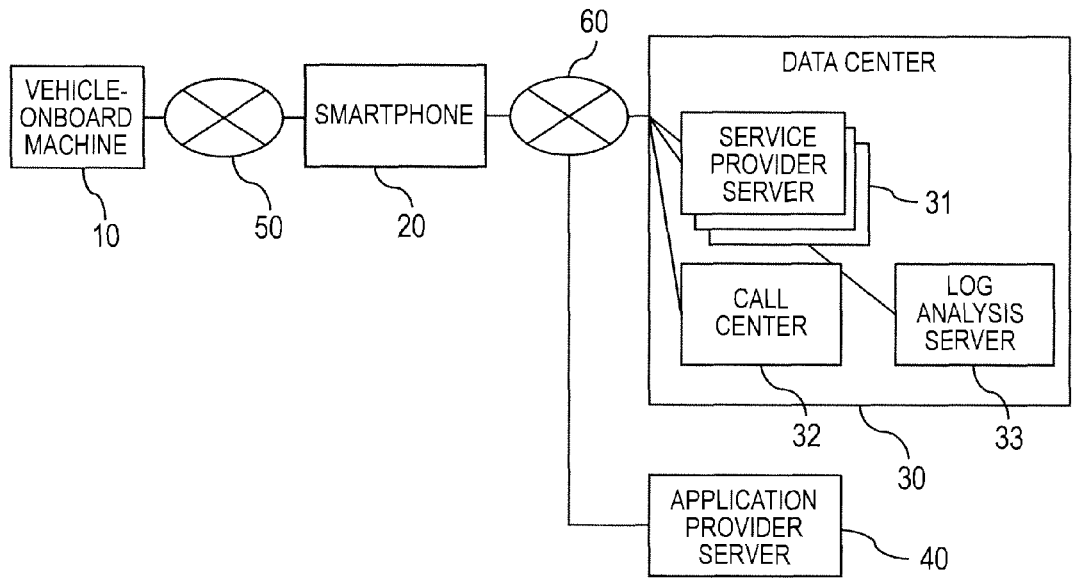
FIG. 1 is an explanatory diagram of a configuration of a vehicle-onboard apparatus system according to an embodiment of this invention.

FIG. 1 is an explanatory diagram of a configuration of a vehicle-onboard apparatus system according to the embodiment of this invention.

The vehicle-onboard apparatus system includes at least a vehicle-onboard machine 10 and a smartphone 20. The vehicle-onboard machine 10 is, for example, a navigation apparatus installed on a vehicle so as to guide a route to a destination. Moreover, the smartphone 20 is an example of a portable terminal, and the portable terminal is not limited to the smartphone 20.

The vehicle-onboard machine 10 and the smartphone 20 are coupled to each other via a network 50 for communication. The vehicle-onboard machine 10 and the smartphone 20 may be coupled to each other wiredly by means of the USB for communication, or may be coupled to each other wirelessly for communication.

The smartphone 20 is coupled via a carrier network (NW) 60 to a data center 30 and an application provider server 40 for communication. The carrier NW 60 may be a network provided by a communication carrier of the smartphone 20, or may be an ISP network provided by an Internet service provider (ISP). The application provider server 40 is a computer for providing the smartphone 20 with an application to be executed on the smartphone 20.

A service provider server 31, a call center 32, and a log analysis server 33 are provided in the data center 30. The service provider server 31 is a computer for providing a user of the vehicle-onboard machine 10 and the smartphone 20 with services. A plurality of service provider servers 31 may be provided for the respective services to be provided. The call center 32 receives a contact from the user via a telephone or the like. The log analysis server 33 is a computer (collection computer) for collecting operation logs from the vehicle-onboard machine 10, the smartphone 20, and the service provider server 31, and analyzing the collected operation logs.

It should be noted that the service provider server 31, the call center 32, and the log analysis server 33 are coupled to each other in the data center 30. Moreover, FIG. 1 illustrates a case where the service provider server 31, the call center 32, and the log analysis server 33 are provided in the data center 30, but the service provider server 31, the call center 32, and the log analysis server 33 may be distributed to and provided in a plurality of data centers. The call center 32 does not always need to be provided in the data center.

If an application to be provided by the application provider server 40 is developed by a manufacturer which manufactures the vehicle-onboard machine 10, the application provider server 40 may be provided in the data center 30.

Figure 2:
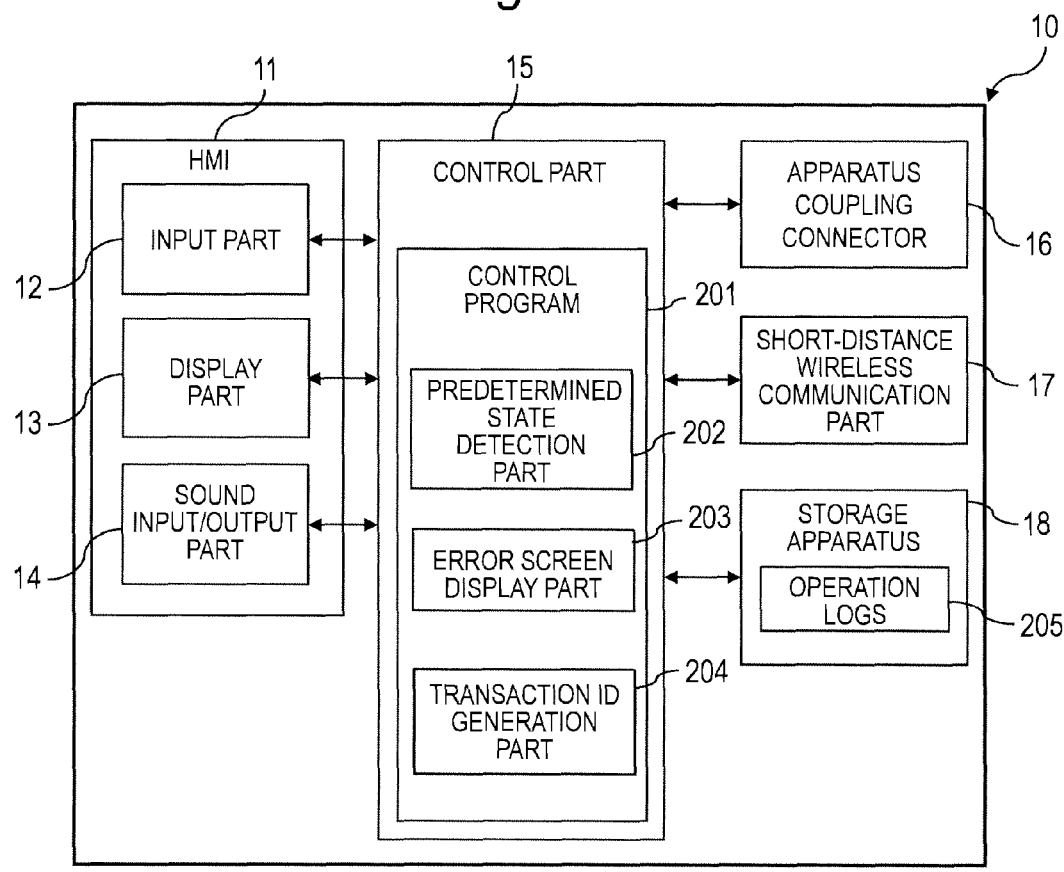
FIG. 2 is a block diagram of a vehicle-onboard machine according to the embodiment of this invention.

FIG. 2 is a block diagram of the vehicle-onboard machine 10 according to the embodiment of this invention. The vehicle-onboard machine 10 includes a human-machine interface (HMI) 11, a control part 15, an apparatus coupling connector 16, a short-distance wireless communication part 17, and a storage apparatus 18.

The HMI 11 is an interface for the vehicle-onboard machine to present data to the user and receive an input of data from the user. The HMI 11 includes an input part 12, a display part 13, and a sound input/output part 14. The input part 12 receives an input of data from the user, the display part 13 displays the data, and the sound input/output part 14 receives an input of sound data from the user, and outputs the sound data.

The control part 15 is, for example, a processor or the like for controlling an operation of the vehicle-onboard machine 10. The apparatus coupling connector 16 wiredly couples the vehicle-onboard machine 10 to an external apparatus such as the smartphone 20. The short-distance wireless communication part 17 wirelessly couples the vehicle-onboard machine 10 to an external apparatus such as the smartphone 20. The wireless coupling includes IEEE 802.15.1. The storage apparatus 18 stores operation logs 205 of the vehicle-onboard machine 10, a control program 201 for controlling an operation of the vehicle-onboard machine 10, and the like. The control part 15 controls the operation of the vehicle-onboard machine 10 by executing the control program 201 stored in the storage apparatus 18.

The control program 201 includes a predetermined state detection part 202, an error screen display part 203, and a transaction ID generation part 204.

The predetermined state detection part 202 detects occurrence of a predetermined state such as a failure on the vehicle-onboard machine 10 and the network 50. The error screen display part 203 displays an error screen 100 illustrated in FIG. 6 on the display part 13 when the predetermined state detection part 202 detects occurrence of the predetermined state. The transaction ID generation part 204 generates a transaction ID for uniquely identifying communication starting from transmission of a service provision request by the vehicle-onboard machine 10 until reception of a response corresponding to the service provision request.

It should be noted that the vehicle-onboard machine 10 does not always need to include both the apparatus coupling connector 16 and the short-distance wireless communication part 17, and needs to include at least one thereof. If the vehicle-onboard machine 10 and the smartphone 20 are coupled to each other wiredly (via a cable) with use of the apparatus coupling connector 16, a component of the network 50 is a cable. Moreover, if the vehicle-onboard machine 10 and the smartphone 20 are coupled to each other wirelessly (via a radio wave) with use of the short-distance wireless communication part 17, a component of the network 50 is a radio wave.

In the vehicle-onboard apparatus system in which the vehicle-onboard machine 10 and the smartphone 20 are coupled to each other for communication, conceivable methods include such a method that the smartphone 20 executes an installed application, and transmits an execution screen via the apparatus coupling connector 16 or the short-distance wireless communication part 17 to the vehicle-onboard machine 10, and the control part 15 of the vehicle-onboard machine 10 controls a screen size and the like, thereby displaying the execution screen on the display part 13, and such a method that the vehicle-onboard machine 10 executes an application to cooperate via the apparatus coupling connector 16 or the short-distance wireless communication part 17 with the smartphone 20. In this embodiment, a description is given of the former method as an example, but this embodiment can be applied to the latter method.

Figure 3:
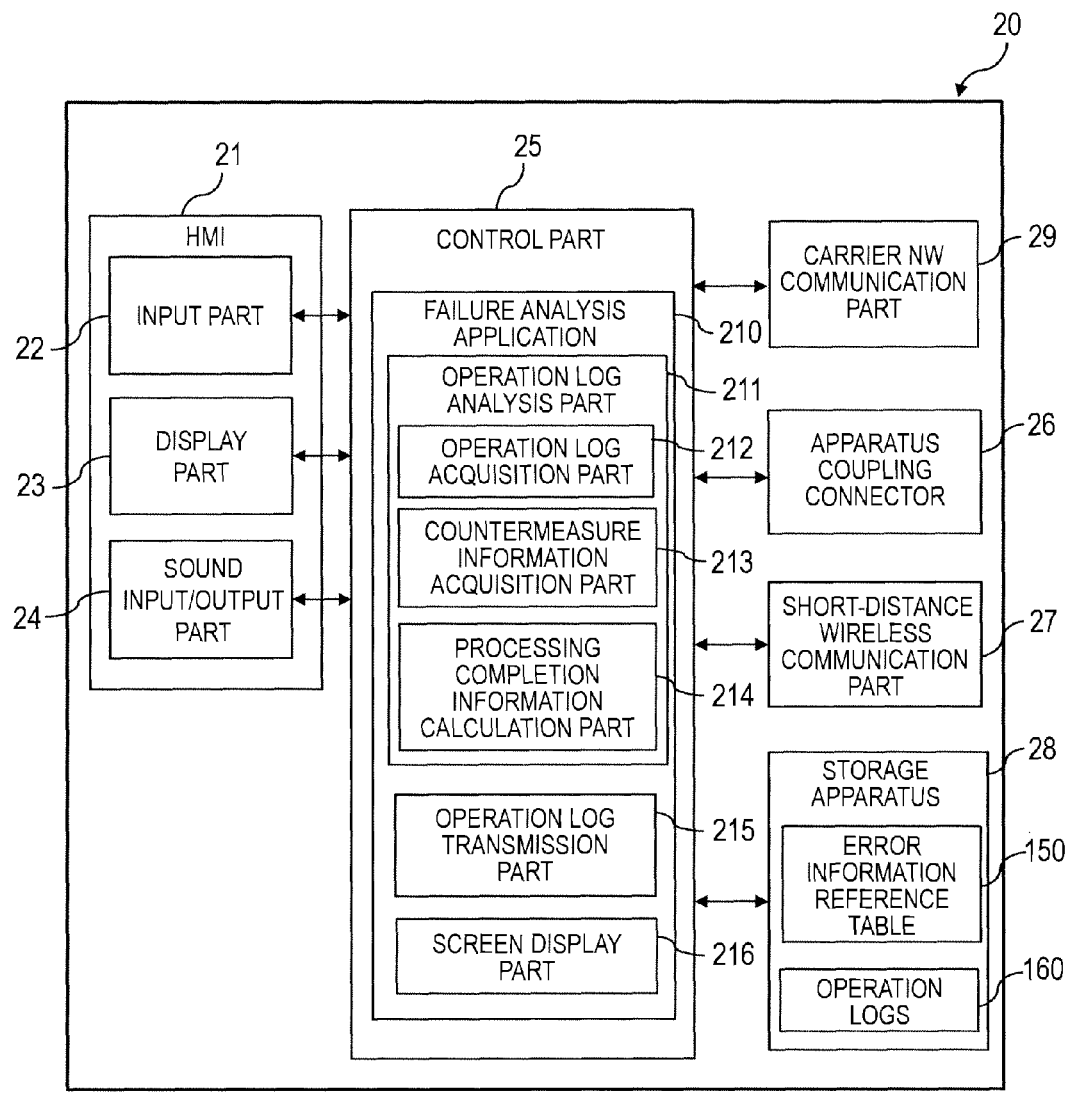
FIG. 3 is a block diagram of a smartphone according to the embodiment of this invention.

FIG. 3 is a block diagram of the smartphone 20 according to the embodiment of this invention. The smartphone 20 includes an HMI 21, a control part 25, an apparatus coupling connector 26, a short-distance wireless communication part 27, a storage apparatus 28, and a carrier NW communication part 29. The HMI 21 includes an input part 22, a display part 23, and a sound input/output part 24. The HMI 21, the apparatus coupling connector 26, and the short-distance wireless communication part 27 are the same as the HMI 11, the apparatus coupling connector 16, and the short-distance wireless communication part 17 of the vehicle-onboard machine 1, and a description thereof is therefore omitted.

The carrier NW communication part 29 is an interface for communication to/from the carrier NW 60. The storage apparatus 28 stores a failure analysis application 210 for analyzing a failure occurred on the vehicle-onboard machine 10 or the network 50, applications (not shown), an error information reference table 150, and operation logs 160.

Information representing a countermeasure for recovering a failure, which corresponds to information representing a type of the failure occurred on the vehicle-onboard machine 10 or the network 50 and information representing to what extent the processing has been completed, is registered to the error information reference table 150. The error information reference table 150 is detailed referring to FIG. 11. The operation log 160 is detailed referring to FIG. 12.

The control part 25 executes the failure analysis application 210 stored in the storage apparatus 28. The failure analysis application 210 includes an operation log analysis part 211, an operation log transmission part 215, and a screen display part 216.

The operation log analysis part 211 analyzes an occurred failure by analyzing the operation logs 160 by using an error code and a transaction ID input to the smartphone 20. The operation log transmission part 215 transmits the operation logs 160 to the log analysis server 33 provided in the data center 30. The screen display part 216 displays screens illustrated in FIGS. 7 to 10 on the display part 23.

The operation log analysis part 211 includes an operation log acquisition part 212, a countermeasure information acquisition part 213, and a processing completion information calculation part 214.

The operation log acquisition part 212 acquires operation logs 160 corresponding to an error code and a transaction ID input to the smartphone 20. The countermeasure information acquisition part 213 refers to the error information reference table 150, and acquires a countermeasure corresponding to the error code and the transaction ID input to the smartphone 20. The processing completion information calculation part 214 refers to the operation logs 160 associated with the transaction ID input to the smartphone 20, thereby calculating processing completion information representing to what extent processing has been completed.

Figure 4:
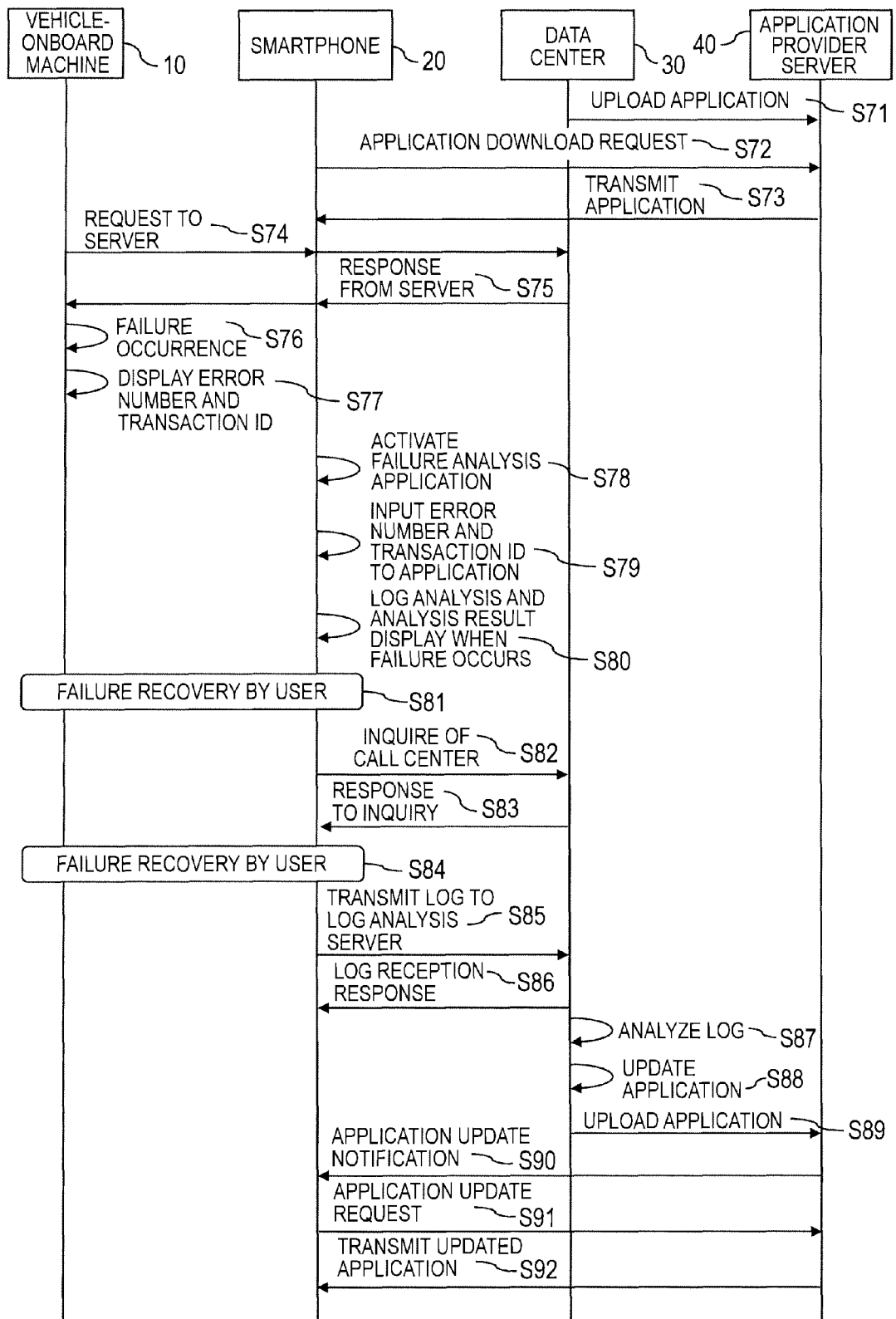
FIG. 4 is a sequence diagram from a download to an update of a failure analysis application according to the embodiment of this invention.

FIG. 4 is a sequence diagram from a download to an update of the failure analysis application 210 according to the embodiment of this invention.

The service provider managing the data center 30 develops applications (including the failure analysis application 210) for providing a user of the vehicle-onboard machine 10 and the smartphone 20 with services, and uploads the developed applications to the application provider server 40 (Step S71).

The smartphone 20 transmits a download request for the applications uploaded by the processing in Step S71 to the application provider server 40 (Step S72). The download request includes information which can identify the application to be downloaded. When the application provider server 40 receives the application download request transmitted from the smartphone 20 by the processing in Step S72, the application provider server 40 transmits the application identified by the information which can identify the application, which is included in the received download request, to the smartphone 20 (Step S73). When the smartphone 20 receives the application transmitted by the processing in Step S73, the smartphone 20 installs the received application. It should be noted that different services are provided for different types of application, and the failure analysis application 210 thus has different analysis methods for the operation logs of the different types of application. The failure analysis application 210 is downloaded along with the application to the smartphone 20, and such a situation that the failure analysis application 210 corresponding to the application is not downloaded is thus prevented.

After the smartphone 20 installs the application, if the user wants to use the service provided by the installed application, the vehicle-onboard machine 10 and the smartphone 20 are coupled to each other for communication. The application installed on the smartphone 20 is used on the vehicle-onboard machine 10, and the vehicle-onboard machine 10 transmits a service provision request via the smartphone 20 to the service provider server 31 (Step S74).

When the service provider server 31 receives the service provision request, the service provider server 31 transmits a response corresponding to the received service provision request to the vehicle-onboard machine 10, thereby providing the user with the service (Step S75).

When the vehicle-onboard machine 10 transmits the service provision request, the transaction ID generation part 204 of the vehicle-onboard machine 10 generates a transaction ID (first identification information) for uniquely identifying communication starting from the transmission of the service provision request until the reception of the response corresponding to the service provision request (until the completion of the provision of the service). Then, the transaction ID generation part 204 includes the generated transaction ID in the service provision request, and transmits the service provision request to the service provider server 31. When the vehicle-onboard machine 10, the smartphone 20, and the service provider server 31 carry out processing relating to the service provision request, the vehicle-onboard machine 10, the smartphone 20, and the service provider server 31 store the logs of the processing and the transaction ID included in the service provision request in association with each other. For example, the transaction ID is generated by concatenating an identifier of the vehicle-onboard machine 10 and a serial number of the service provision request transmitted on the vehicle-onboard machine 10.

Figure 5:
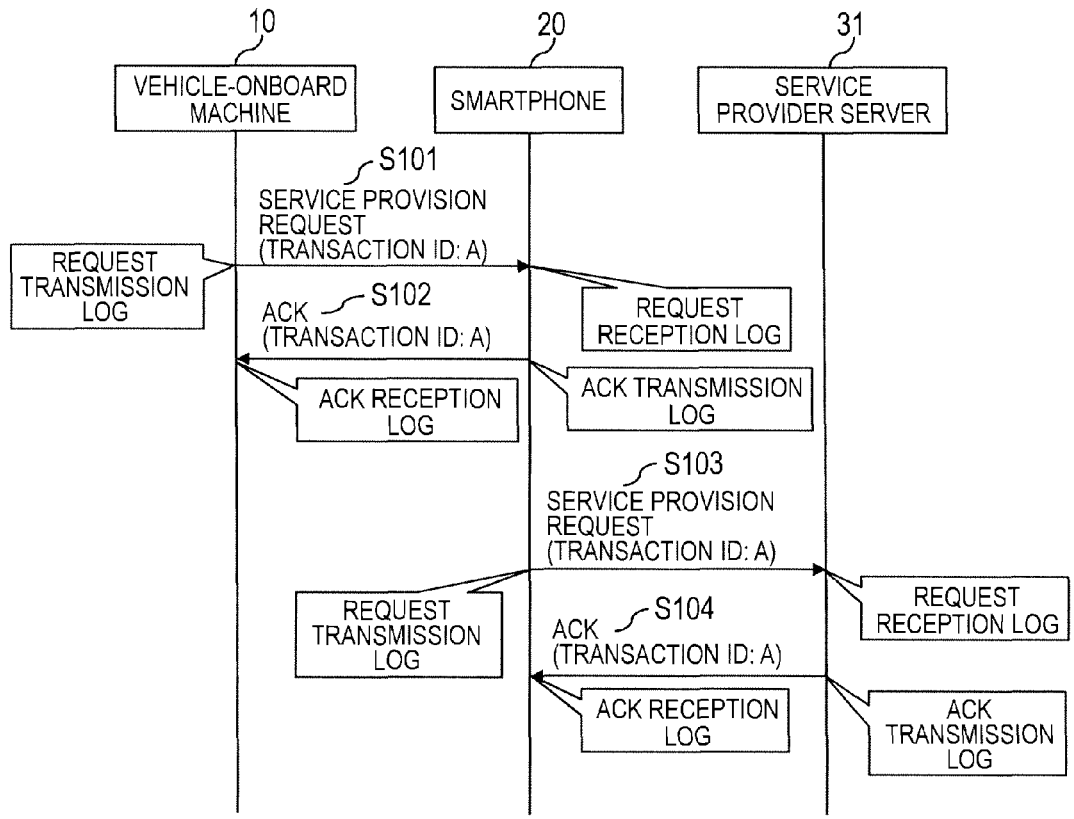
FIG. 5 is an explanatory diagram of operation logs stored when the service provision request according to the embodiment of this invention is transmitted.

On this occasion, referring to FIG. 5, a description is given of the operation log 205 stored in the vehicle-onboard machine 10, the operation log 160 stored in the smartphone 20, and the operation log stored in the service provider server 31 when the vehicle-onboard machine 10 transmits the service provision request by the processing in Step S74. FIG. 5 is an explanatory diagram of the operation logs stored when the service provision request according to the embodiment of this invention is transmitted.

The transaction ID generation part 204 of the vehicle-onboard machine 10 generates a transaction ID "A", and transmits a service provision request including the generated transaction ID to the smartphone 20 (Step S101). In this case, the transaction ID generation part 204 stores an operation log 205 associating the transaction ID "A" and a request transmission log with each other. It should be noted that request transmission log is the operation log 205 representing the transmission of the service request.

When the smartphone 20 receives the service provision request, the smartphone 20 stores an operation log 160 associating the transaction ID "A" included in the received service provision request and a request reception log with each other. Then, the smartphone 20 transmits an ACK corresponding to the received service provision request to the vehicle-onboard machine 10 (Step S102). In this case, the smartphone 20 stores the operation log 160 associating the transaction ID "A" and an ACK transmission log with each other.

Moreover, the smartphone 20 transmits the received service provision request to the service provider server 31 (Step S103). In this case, the smartphone 20 stores an operation log 160 associating the transaction ID "A" and a request transmission log with each other.

When the service provider server 31 receives the service provision request, the service provider server 31 stores the transaction ID "A" included in the received service provision request and a request reception log in association with each other. Then, the service provider server 31 transmits an ACK corresponding to the received service provision request to the smartphone 20 (Step S104). In this case, the service provider server 31 stores an operation log associating the transaction ID "A" and an ACK transmission log with each other.

When the smartphone 20 receives the ACK, the smartphone 20 stores an operation log 160 associating the transaction ID "A" included in the received ACK and an ACK reception log with each other.

Also when the service provider server 31 transmits a response including the transaction ID "A" and corresponding to the service provision request, similar operation logs are stored in the service provider server 31, the smartphone 20, and the vehicle-onboard machine 10.

In this way, until the vehicle-onboard machine 10 receives the response to the transmitted request, in other words, until a series of pieces of processing caused by the request are finished, the vehicle-onboard machine 10 and the smartphone 20 store the same transaction ID and the respective operation logs 205 and 160 in association with each other. As a result, if the operation of the vehicle-onboard machine 10 and the operation of the smartphone 20 relate to each other, the operation logs 205 and 160 are associated with the same transaction ID.

Returning to FIG. 4, a description is given of a sequence from the download to the update of the failure analysis application 210.

It is assumed that a failure has occurred on the vehicle-onboard machine 10 or the network 50 while the processing in Step S74 or S75 is carried out (Step S76). The predetermined state detection part 202 of the vehicle-onboard machine 10 detects the occurred failure by the processing in Step S76. Then, when the predetermined state detection part 202 detects the failure, the error screen display part 203 of the vehicle-onboard machine 10 displays the error screen 100 illustrated in FIG. 6 on the display part 13 (Step S77). The error screen 100 includes a transaction ID when the failure occurs, and an error code corresponding to the failure, which is described in detail referring to FIG. 6. It should be noted that the predetermined state is not limited to the case where the failure occurs on the vehicle-onboard machine 10 or the network 50, and when the predetermined state detection part 202 of the vehicle-onboard machine 10 detects that the vehicle-onboard machine 10 or the network 50 enters a predetermined state, the error screen display part 203 may carry out the processing in Step S77.

The smartphone 20 activates the failure analysis application 210 (Step S78). The failure analysis application 210 may be manually activated by the user, or may be automatically activated when the smartphone 20 detects a failure.

Figure 15:
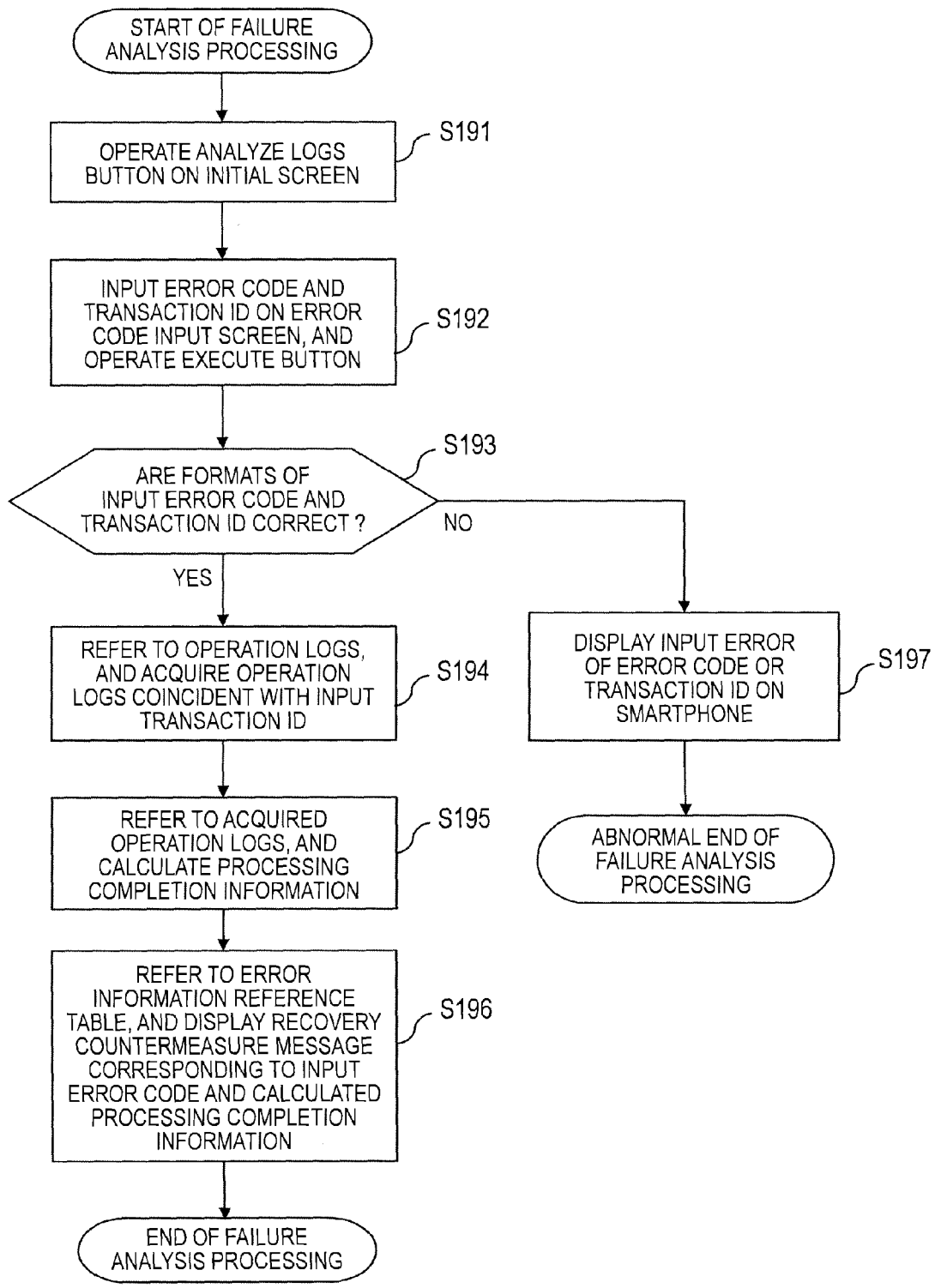
FIG. 15 is a flowchart of failure analysis processing carried out by an operation log analysis part of the failure analysis application according to the embodiment of this invention.

After the failure analysis application 210 is activated, the smartphone 20 receives an input of the error code and the transaction ID included in the error screen 100 displayed on the vehicle-onboard machine 10 (Step S79). Then, the operation log analysis part 211 of the smartphone 20 analyzes the operation logs 160 recorded in the smartphone 20 based on the error code and the transaction ID of the input received by the processing in Step S79, thereby analyzing the failure, and the screen display part 216 displays the analysis result by the operation log analysis part 211 on the display part of the smartphone 20 (Step S80). The analysis result displayed on the display part 23 of the smartphone 20 includes a countermeasure against the failure. Referring to FIG. 15, a detailed description is given of the processing in Steps S78 to S80.

The user refers to the analysis result displayed on the display part 23 of the smartphone 20 in Step S80, thereby carrying out the failure recovery operation (Step S81). If the user cannot recover the failure, the user inquires about the failure recovery to the call center 32 in the data center 30 (Step S82). A telephone call and a mail are conceivable as a method of inquiry to the call center 32 by the user. The call center 32, which has received the inquiry by the user, notifies the user of a failure recovery sequence (Step S83). The user who has received the notification of the failure recovery sequence from the call center 32 carries out the failure recovery operation based on the failure recovery sequence (Step S84).

It should be noted that if the failure is recovered in Step S81, or if the user determines that the failure cannot be recovered in Step S81 (for example, if a message telling necessity of taking the vehicle-onboard machine to a repair shop is displayed as a result of the analysis by the processing in Step S80), Steps S82 to S84 may be omitted.

Then, the operation log transmission part 215 of the smartphone 20 transmits the operation logs 160 stored therein and the input error code and transaction ID to the log analysis server 33 provided in the data center 30 (Step S85).

When the log analysis server 33 receives the operation logs 160, the error code, and the transaction ID, the log analysis sever 33 transmits a log reception response to the smartphone 20 (Step S86). It should be noted that the operation logs 160 stored in the smartphone 20 and the operation logs 205 stored in the vehicle-onboard machine 10 are transmitted to the log analysis server 33 at an arbitrary timing even if abnormality is not detected. The log analysis server 33 analyzes the operation logs of each user (Step S87). Then, the service provider updates the application while referring to the analysis result in Step S87 (Step 88), and uploads the application after the update to the application provider server 40 (Step 89).

When the application after the update is uploaded, the application provider server 40 transmits a notification notifying that the application can be updated to the smartphone 20 (Step S90). When the smartphone 20 receives the notification transmitted by the processing in Step S90, the smartphone 20 transmits an application update request manually by the user or automatically to the application provider server 40 (Step S91). The application provider server 40 transmits the application after the update to the smartphone 20 (Step S92), and when the smartphone 20 receives the application after the update, the smartphone 20 updates the application.

In the sequence diagram illustrated in FIG. 4, the processing is described assuming that the smartphone 20 does not acquire the operation logs 205 of the vehicle-onboard machine 10, but the sequence in FIG. 4 can be applied to, for example, a case where the smartphone 20 acquires the operation logs 205 of the vehicle-onboard machine 10 at a predetermined timing, or a case where the smartphone 20 can acquire the operation logs 205 of the vehicle-onboard machine 10 without influence of a failure.

A description is now given of, for example, the case where the smartphone 20 acquires the operation logs 205 of the vehicle-onboard machine 10 at the predetermined timing. When a failure occurs to the vehicle-onboard machine 10 in Step S76, the smartphone 20 stores operation logs 205 of the vehicle-onboard machine 10 until immediately before Step S76. The smartphone 20 analyzes the failure based on the operation logs 160 of itself and the operation logs 205 of the vehicle-onboard machine 10 by the processing in Step S80. Moreover, the smartphone 20 transmits the operation logs 160 of itself and the operation logs 205 of the vehicle-onboard machine 10 to the log analysis server 33 by the processing in Step S85.

Moreover, the operation log analysis processing by the log analysis server 33 in the processing in Step S87 triggers the update of the application by the service provider in FIG. 4, but the operation log analysis processing and the update of the application may be carried out at timings different from each other.

Figure 6:
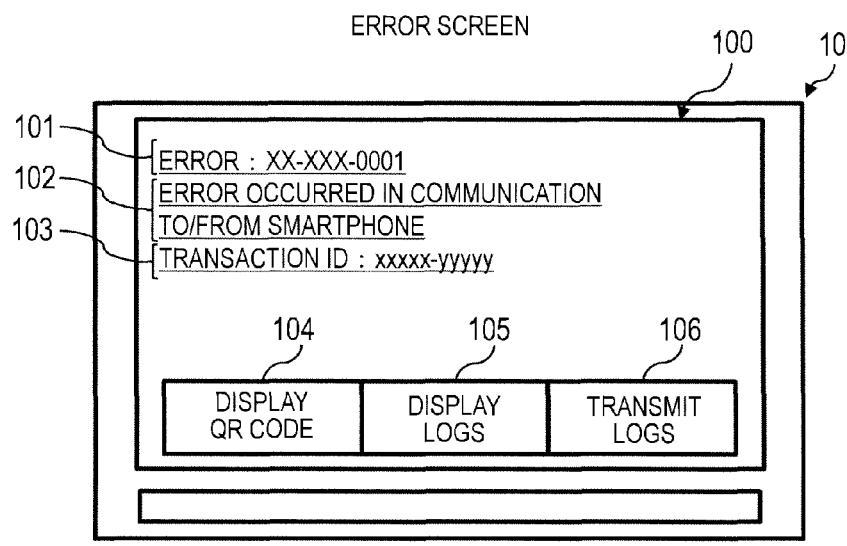
FIG. 6 is an explanatory diagram for an error screen displayed on the vehicle-onboard machine according to the embodiment of this invention.

FIG. 6 is an explanatory diagram for the error screen 100 displayed on the vehicle-onboard machine 10 according to the embodiment of this invention.

The error screen 100 is displayed on the display part 13 of the vehicle-onboard machine 10 by the processing in Step S77 illustrated in FIG. 4. The error screen 100 includes an error code display area 101, an error message display area 102, a transaction ID display area 103, a DISPLAY QR CODE switch 104, a DISPLAY LOGS switch 105, and a TRANSMIT LOGS switch 106.

An error code representing a type of a detected failure is displayed in the error code display area 101. A predetermined digit of the error code may be a value representing setting information of the vehicle-onboard machine 10 when a failure is detected. For example, the lowest digit of the error code may represent a communication setting when a failure is detected in the short-distance wireless communication part 17 of the vehicle-onboard machine 10, a field intensity of radio wave between the vehicle-onboard machine 10 and the smartphone 20, or the like. The user refers to the value representing the setting information of the vehicle-onboard machine 10, thereby carrying out the failure recovery operation.

An error message representing a content of the detected failure is displayed in the error message display area 102. A transaction ID when the failure occurs is displayed in the transaction ID display area 103.

Moreover, when the DISPLAY QR CODE switch 104 is operated, the error screen display part 203 of the vehicle-onboard machine 10 displays the error code, the error message, and the transaction ID as a QR code. When the DISPLAY LOGS switch 105 is operated, the error screen display part 203 of the vehicle-onboard machine 10 displays the operation logs 205 associated with a transaction ID when a failure was detected. When the TRANSMIT LOGS switch 106 is operated, the error screen display part 203 of the vehicle-onboard machine 10 transmits the operation logs 205 associated with the transaction ID when the failure was detected via the smartphone 20 to the log analysis server 33.

For example, operations on the various switches 104 to 106 are input from the input part 12 of the vehicle-onboard machine 10. Examples of an input method includes selection by the user from buttons installed on the vehicle-onboard machine 10, and a direct touch by the user on a touch panel constituting the display part 13 of the vehicle-onboard machine 10.

It should be noted that the number of pieces of information included in the error screen 100 may be increased depending on functions and information required by the service provider.

Figure 7:
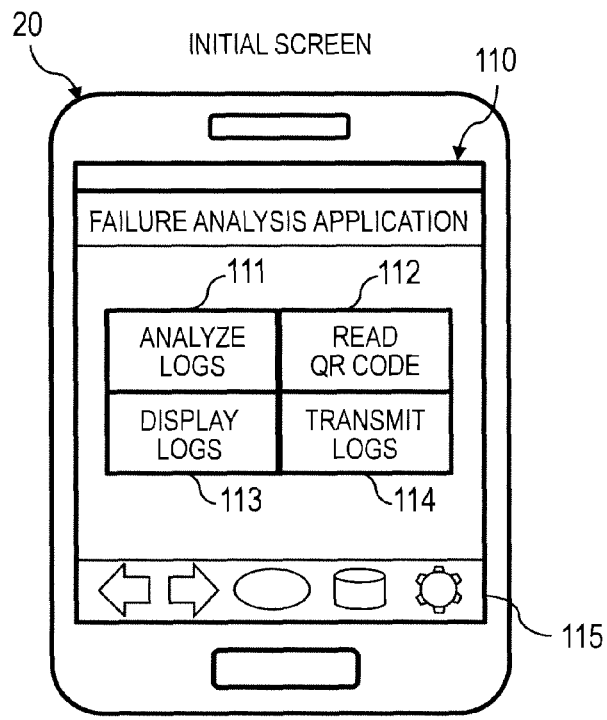
FIG. 7 is an explanatory diagram of an initial screen displayed when the failure analysis application is activated according to the embodiment of this invention.

A description is now given of a screen displayed by the screen display part 216 of the failure analysis application 210 activated on the smartphone 20. FIG. 7 is an explanatory diagram of an initial screen 110 displayed when the failure analysis application 210 is activated in Step S78 according to the embodiment of this invention.

The initial screen 110 includes an ANALYZE LOGS button 111, a READ QR CODE button 112, a DISPLAY LOGS button 113, a TRANSMIT LOGS button 114, and application-specific operation buttons 115. The application-specific operation buttons 115 are operation buttons for service provision applications including the failure analysis application 210, and include, for example, a previous screen display button, a next screen display button, and a setting button.

Figure 9:
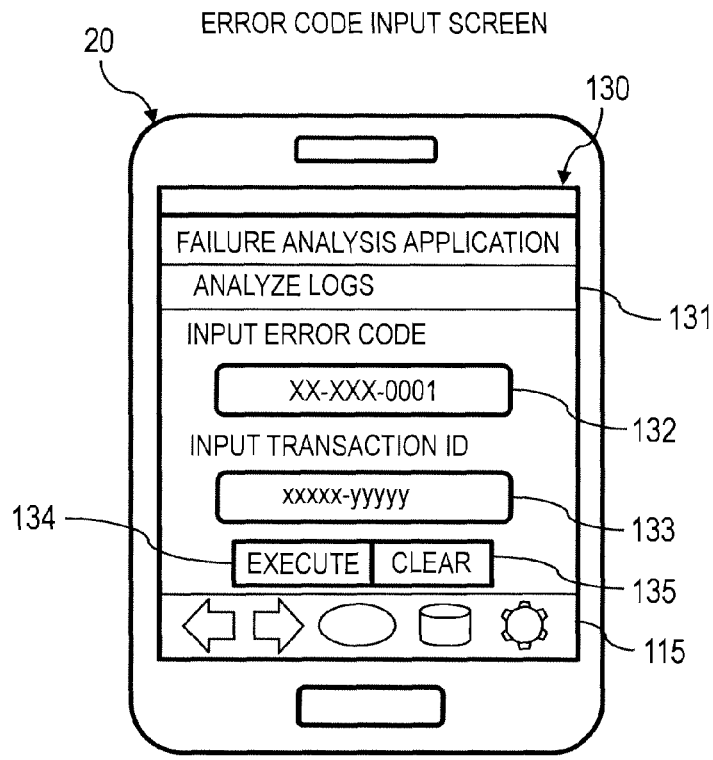
FIG. 9 is an explanatory diagram of an error code input screen according to the embodiment of this invention.

When the ANALYZE LOGS button 111, the DISPLAY LOGS button 113, or the TRANSMIT LOGS button 114 is operated, the screen display part 216 displays an error code input screen 130 illustrated in FIG. 9. When an error code and a transaction ID are input on the error code input screen 130, processing corresponding to the operated button is carried out. Specifically, if the ANALYZE LOGS button 111 is operated, when an error code and a transaction ID are input on the error code input screen 130, the screen display part 216 displays a log analysis result screen 140 illustrated in FIG. 10. If the DISPLAY LOGS button 113 is operated, when an error code and a transaction ID are input on the error code input screen 130, the screen display part 216 displays a log result screen 170 illustrated in FIG. 13. If the TRANSMIT LOGS button 114 is operated, when an error code and a transaction ID are input on the error code input screen 130, the operation log transmission part 215 transmits the input error code and transaction ID as well as operation logs 160 associated with the transaction ID to the log analysis server 33.

Figure 8:
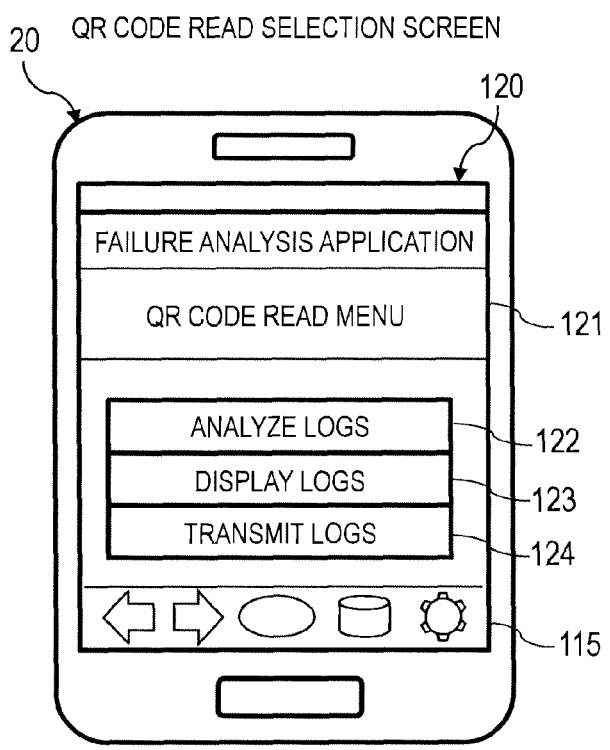
FIG. 8 is an explanatory diagram of a QR code read selection screen according to this embodiment of this invention.

Moreover, when the READ QR CODE button 112 is operated, the screen display part 216 displays a QR code read selection screen 120 illustrated in FIG. 8. If the smartphone 20 itself does not include a QR code read function, the screen display part 216 displays such a message that the QR code cannot be read.

FIG. 8 is an explanatory diagram of the QR code read selection screen 120 according to this embodiment of this invention.

The QR code read selection screen 120 includes the application-specific operation buttons 115, a menu bar 121, an ANALYZE LOGS button 122, a DISPLAY LOGS button 123, and a TRANSMIT LOGS button 124. The application-specific operation buttons 115 are the same as those on the initial screen 110 illustrated in FIG. 7, and a description thereof is therefore omitted.

The menu bar 121 displays that the screen is the QR code read selection screen 120. When the ANALYZE LOGS button 122, the DISPLAY LOGS button 123, or the TRANSMIT LOGS button 124 is operated, the control part 25 activates an application for reading a QR code displayed on the vehicle-onboard machine 10, reads the QR code, and carries out processing corresponding to the operated button. Specifically, the same processing as the case where the ANALYZE LOGS button 111, the DISPLAY LOGS button 113, or the TRANSMIT LOGS button 114 is operated on the initial screen 110 is carried out, and a description thereof is therefore omitted. The smartphone 20 reads a specific image such as a QR code to receive an input of an error code and a transaction ID, thereby saving labor required for a manual input of the error code and the transaction ID into the smartphone 20 by the user.

The screens illustrated in FIGS. 7 and 8 are screens permitting the user to select processing to be carried out when an error code and a transaction ID are input. As a result, the user can control the failure analysis application 210 to carry out desired processing depending on user's priority.

FIG. 9 is an explanatory diagram of the error code input screen 130 according to the embodiment of this invention.

The error code input screen 130 is displayed when the ANALYZE LOGS button 111, the DISPLAY LOGS button 113, or the TRANSMIT LOGS button 114 is operated on the initial screen 110 illustrated in FIG. 7. The error code input screen 130 illustrated in FIG. 9 is displayed when the ANALYZE LOGS button 111 on the initial screen 110 is operated.

The error code input screen 130 includes the application-specific operation buttons 115, a menu bar 131, an error code input form 132, a transaction ID input form 133, an EXECUTE button 134, and a CLEAR button 135. The application-specific operation buttons 115 are the same as those on the initial screen 110 illustrated in FIG. 7, and a description thereof is therefore omitted.

Information which can identify processing corresponding to a button operated before the error code input screen 130 is displayed is displayed on the menu bar 131. Information which can identify log analysis processing corresponding to the ANALYZE LOGS button 111 is displayed on the menu bar 131 of the error code input screen 130 illustrated in FIG. 9.

The error code input form 132 is an area to which an error code on the error screen 100 displayed on the vehicle-onboard machine 10 illustrated in FIG. 6 is input. The transaction ID input form 133 is an area to which a transaction ID on the error screen 100 displayed on the vehicle-onboard machine 10 illustrated in FIG. 6 is input.

When the EXECUTE button 134 is operated, the operation log analysis part 211 carries out processing corresponding to the information displayed on the menu bar 131. When the CLEAR button 135 is operated, the values input to the error code input form 132 and the transaction ID input form 133 are cleared.

In FIG. 8, when an error code is input to the error code input form 132, a transaction ID is input to the transaction ID input form 133, and the EXECUTE button 134 is operated, the operation log analysis part 211 carries out the log analysis processing.

Figure 10:
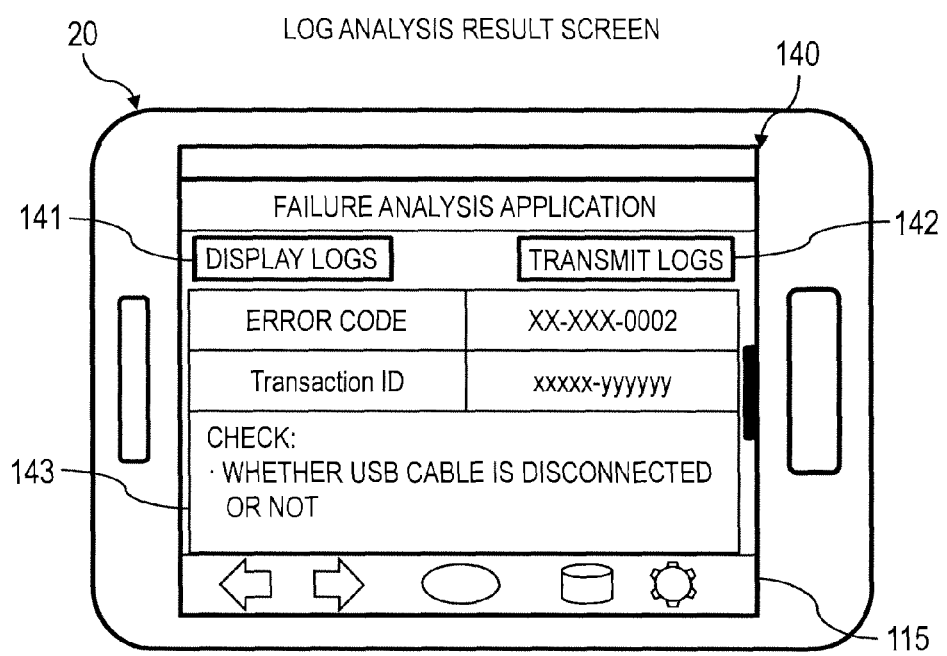
FIG. 10 is an explanatory diagram of a log analysis result screen according to the embodiment of this invention.

FIG. 10 is an explanatory diagram of the log analysis result screen 140 according to the embodiment of this invention.

When the ANALYZE LOGS button 111 is operated on the initial screen 110 illustrated in FIG. 7, and an error code and a transaction ID are manually input, or when the ANALYZE LOGS button 122 is operated on the QR code read selection screen 120 illustrated in FIG. 8, and an error code and a transaction ID are input by reading a QR code, the log analysis result screen 140 is displayed.

The log analysis result screen 140 includes the application-specific operation buttons 115, a DISPLAY LOGS button 141, a TRANSMIT LOGS button 142, and a log analysis result 143. The application-specific operation buttons 115 are the same as the application-specific operation buttons 115 on the initial screen 110 illustrated in FIG. 7, and a description thereof is therefore omitted.

Figure 13:
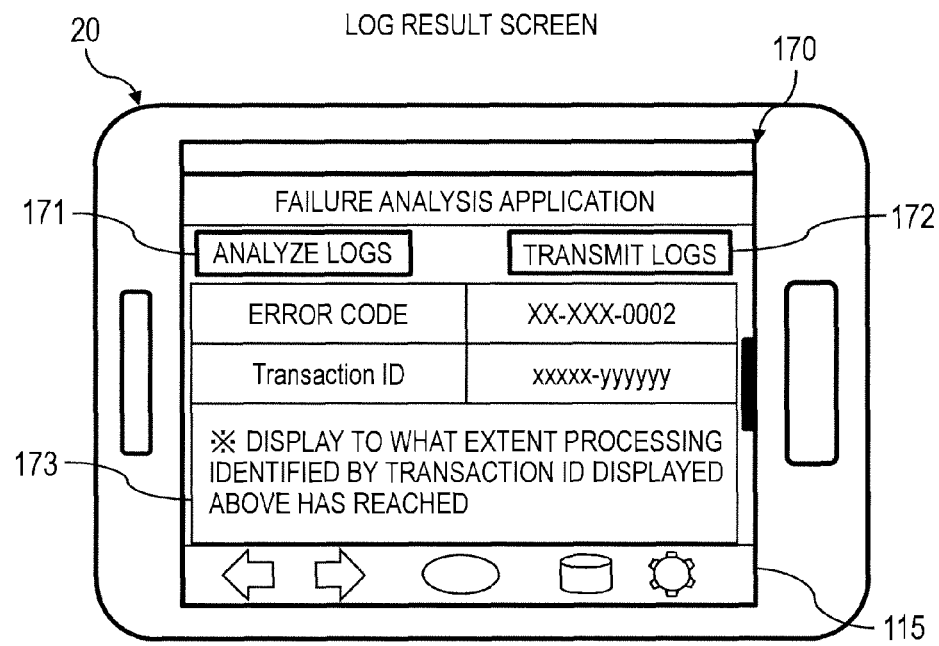
FIG. 13 is an explanatory diagram of a log result screen according to the embodiment of this invention.

When the DISPLAY LOGS button 141 is operated, the log result screen 170 illustrated in FIG. 13 is displayed.

When the TRANSMIT LOGS button 142 is operated, the operation log transmission part 215 transmits input error code and transaction ID as well as operation logs 160 to the log analysis server 33 as in the case where the TRANSMIT LOGS button 114 is operated on the initial screen 110 illustrated in FIG. 7.

A message (recovery countermeasure message) for a countermeasure for recovering a failure based on processing completion information representing to what extent processing identified by the input error code and the input transaction ID has been completed is displayed on the log analysis result 143. The processing completion information calculation part 214 of the operation log analysis part 211 refers to operation logs 160 associated with the input transaction ID, thereby calculating processing completion information. Then, the countermeasure information acquisition part 213 refers to the error information reference table 150 illustrated in FIG. 11, and acquires a recovery countermeasure message corresponding to the input error code and the calculated processing completion information. Then, the screen display part 216 displays the failure recovery message acquired by the countermeasure information acquisition part 213 on the log analysis result 143.

FIG. 11 is an explanatory diagram of the error information reference table 150 according to the embodiment of this invention.

The error information reference table 150 includes vehicle-onboard machine error codes 151, processing completion information 152, and recovery countermeasure messages 153.

An error code displayed by the vehicle-onboard machine 10 is registered to the vehicle-onboard machine error code 151. Information representing to what extent the processing identified by the transaction ID has been completed is registered to the processing completion information 152. Information representing a content of the countermeasure for recovering the failure is registered to the recovery countermeasure message 153.

A detailed description is now given of the processing of acquiring the recovery countermeasure message.

First, the countermeasure information acquisition part 213 acquires records having an error code registered to the vehicle-onboard machine error code 151 of the error information reference table 150, which coincides with the input error code. Then, the operation log acquisition part 212 acquires operation logs 160 associated with the input transaction ID from the operation logs 160 stored in the smartphone 20. Then, the processing completion information calculation part 214 refers to the operation logs 160 acquired by the operation log acquisition part 212, and calculates the processing completion information representing to what extent the processing identified by the input transaction ID has been completed.

Then, the countermeasure information acquisition part 213 identifies a record having information registered to the processing completion information 152, which corresponds to the calculated processing completion information, out of the acquired records. Then, the screen information display part 217 displays a message registered to the recovery countermeasure message 153 of the identified record on the log analysis result 143.

As a result, the user carries out a failure recovery operation while referring to the recovery countermeasure message displayed on the log analysis result 143 displayed on the smartphone 20, thereby carrying out an appropriate failure recovery operation, and possibility of recovering the failure without making a telephone call to the call center 32 thus increases.

FIG. 12 is an explanatory diagram of the operation log 160 stored in the smartphone 20 according to the embodiment of this invention.

The operation log 160 is output to the storage apparatus 18 while the smartphone 20 executes an application. An output form of the operation log 160 may be arbitrarily set by the service provider, but the operation log 160 always includes a transaction ID 161 which has caused the operation. The operation log 160 may be displayed on the display part 23 of the smartphone 20 by the user operating the application-specific operation button 115.

An output form of the operation log 205 recorded in the vehicle-onboard machine 10 is also the same as that in FIG. 12, and a description thereof is therefore omitted.

FIG. 13 is an explanatory diagram of the log result screen 170 according to the embodiment of this invention.

When the DISPLAY LOGS button 113 is operated on the initial screen 110 illustrated in FIG. 7, and an error code and a transaction ID are manually input, or when the DISPLAY LOGS button 123 is operated on the QR code read selection screen 120 illustrated in FIG. 8, and an error code and a transaction ID are input by reading a QR code, the log result screen 170 is displayed.

The log result screen 170 includes the application-specific operation buttons 115, an ANALYZE LOGS button 171, a TRANSMIT LOGS button 172, and a log result 173. The application-specific operation buttons 115 are the same as the application-specific operation buttons 115 on the initial screen 110 illustrated in FIG. 7, and a description thereof is therefore omitted.

When the ANALYZE LOGS button 171 is operated, the log analysis result screen 140 illustrated in FIG. 10 is displayed.

When the TRANSMIT LOGS button 172 is operated, the operation log transmission part 215 transmits input error code and transaction ID as well as operation logs 160 to the log analysis server 33 as in the case where the TRANSMIT LOGS button 114 is operated on the initial screen 110 illustrated in FIG. 7.

Figure 14:
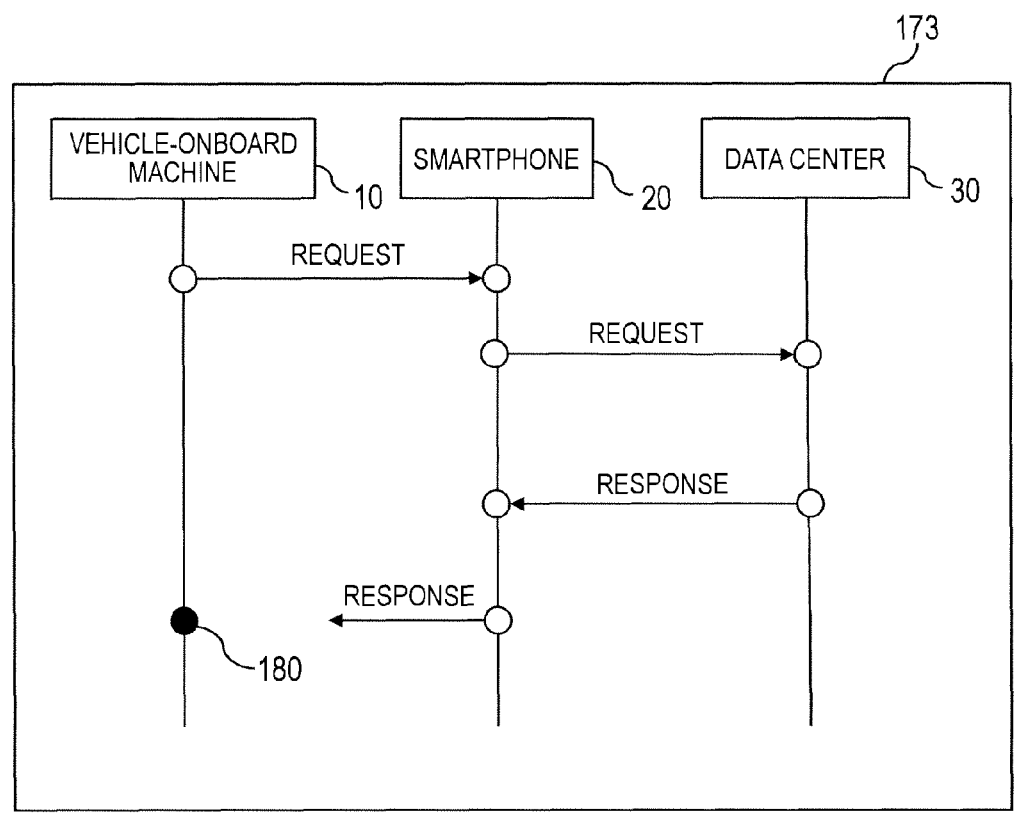
FIG. 14 is an explanatory diagram for a method of displaying a log result on the log result screen as a sequence diagram according to the embodiment of this invention.

Processing completion information calculated based on operation logs 160 associated with the input transaction ID is displayed on the log result 173. A display method for the processing completion information may be display of a sentence as illustrated in FIG. 13 or display of a sequence diagram as illustrated in FIG. 14.

If the processing completion information is displayed as a sentence, a message such "as an operation log for the input transaction ID is absent" or "processing for the input transaction ID is timed out during reception of request" is displayed.

If the processing completion information is displayed as a sequence diagram, to what extent the processing has been completed is visually displayed. Referring to FIG. 14, a detailed description is given of this configuration.

It should be noted that a display method for the log result 173 may be changed depending on an operation on the application-specific operation button 115.

FIG. 14 is an explanatory diagram for a method of displaying the log result 173 on the log result screen 170 as a sequence diagram according to the embodiment of this invention.

Processing illustrated in FIG. 14 is such processing that the vehicle-onboard machine 10 transmits a certain request, and receives a response corresponding to the request from the service provider server 31 provided in the data center 30.

The smartphone 20 receives the response from the service provider server 31, and transmits the response to the vehicle-onboard machine 10, but the smartphone 20 does not receive an ACK to the response from the vehicle-onboard machine 10. Therefore, an ACK reception log corresponding to a response transmission log is not stored in the smartphone 20.

Thus, the processing completion information calculation part 214 refers to the operation logs 160, thereby calculating, as the processing completion information, such the state that the processing up to the transmission of the response by the smartphone 20 has been completed, and the vehicle-onboard machine 10 has not received the response transmitted by the smartphone 20. In FIG. 14, the response reception processing by the vehicle-onboard machine is represented by a black dot as failure occurrence processing.

As illustrated in FIGS. 13 and 14, the processing completion information is displayed, and the user can thus recognize to what extent the processing has been completed, and which pieces of processing have not been completed. As a result, the user can refer to the displayed processing completion information, thereby carrying out the failure recovery operation, and even if the user makes a telephone call to the call center 32, the user can tell the processing completion information to the call center 32, thereby enabling the call center 32 to acquire detailed information on the failure.

FIG. 15 is a flowchart of failure analysis processing carried out by the operation log analysis part 211 of the failure analysis application 210 according to the embodiment of this invention. The failure analysis processing is processing from Steps S78 to S80 illustrated in FIG. 4.

First, the operation log analysis part 211 receives an operation on the ANALYZE LOGS button 111 on the initial screen 110 illustrated in FIG. 7 (Step S191), and the screen display part 216 displays the error code input screen 130 illustrated in FIG. 9. Then, after an error code is input to the error code input form 132 and a transaction ID is input to the transaction ID input form 133 of the error code input screen 130, the operation log analysis part 211 receives an operation on the EXECUTE button 134 (Step S192).

If the operation log analysis part 211 receives the operation on the EXECUTE button 134 in the processing in Step S192, the operation log analysis part 211 determines whether or not the input error code and transaction ID match respective formats (Step S193).

If the operation log analysis part 211 determines that the input error code and transaction ID match the respective formats in the processing in Step S193, the operation log acquisition part 212 acquires operation logs 160 associated with the input transaction ID from the operation logs 160 stored in the smartphone 20 (Step S194). Then, the processing completion information calculation part 214 refers to the acquired operation logs 160, and calculates the processing completion information representing to what extent the processing identified by the transaction ID has been completed (Step S195).

The countermeasure information acquisition part 213 refers to the error information reference table 150, and acquires information registered to the recovery countermeasure message 153, which corresponds to the input error code and the processing completion information calculated by the processing completion information calculation part 214 by the processing in Step S195. Then, the image display part 216 displays the information acquired by the countermeasure information acquisition part 213 on the log analysis result 143 of the log analysis result screen 140 (Step S196), and finishes the processing.

On the other hand, in the processing in Step S193, if it is determined that at least one of the input error code or transaction ID does not match the format, the screen display part 216 displays a message representing an input error of the error code or the transaction ID on the smartphone 20, and abnormally finishes the processing.

Figure 16:
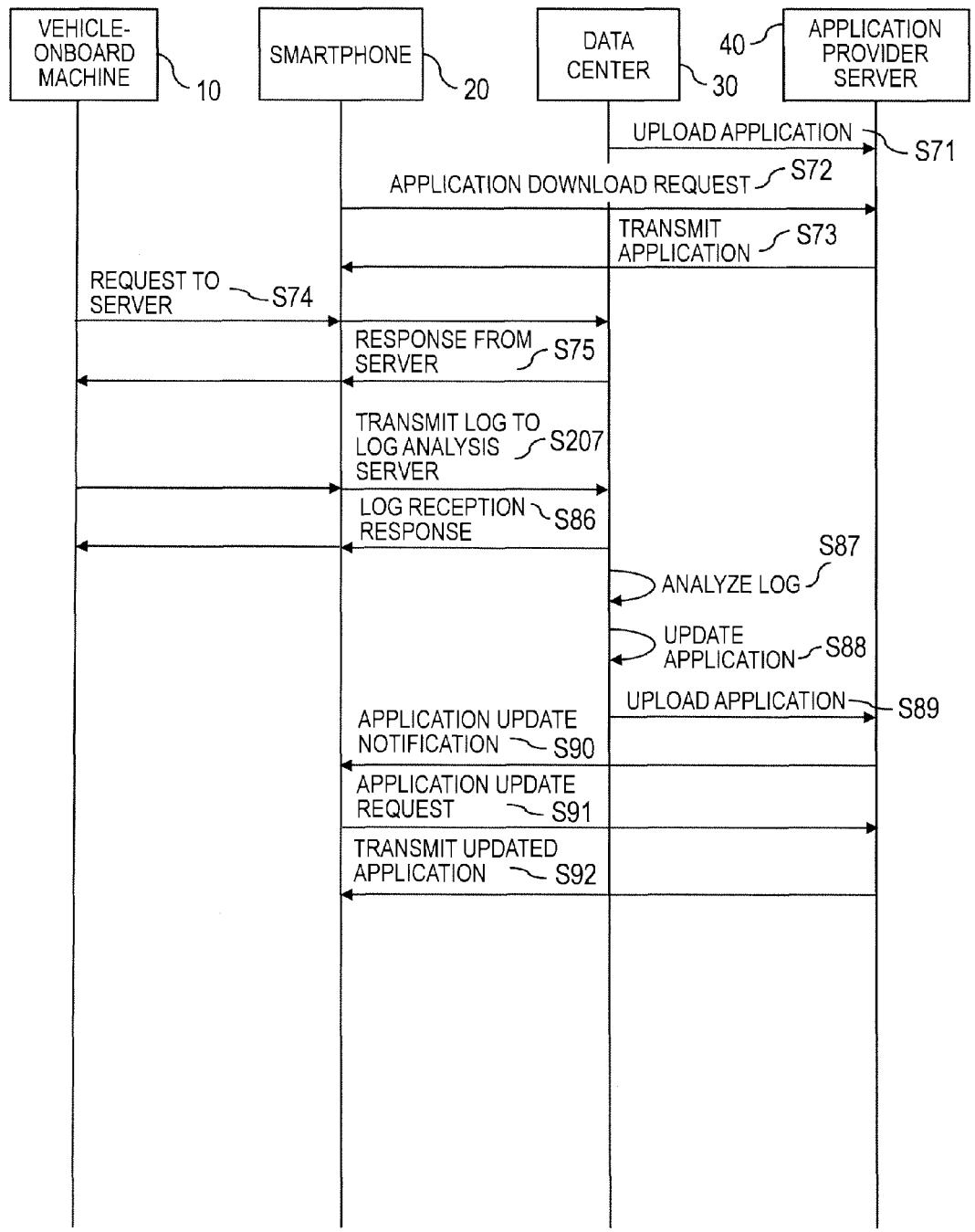
FIG. 16 is a sequence diagram from the download to the update of the failure analysis application if a failure does not occurs according to the embodiment of this invention; and, FIG. 17 is a sequence diagram illustrating a case where a program whose service is provided by a service provider server is installed on the vehicle-onboard machine according to the embodiment of this invention.

Referring to FIG. 16, a description is now given of transmission of the operation logs 205 and 160 when the vehicle-onboard machine 10 and the network 50 normally operate. Referring to FIGS. 1 to 15, a description is given of the case where the operation logs 205 are transmitted when a failure occurs on the vehicle-onboard machine 10 or the network 50, but the vehicle-onboard machine 10 and the smartphone 20 can transmit the operation logs 205 and 160 even if a failure doses not occurs on the vehicle-onboard machine 10 or the network 50.

FIG. 16 is a sequence diagram from the download to the update of the failure analysis application 210 if a failure does not occurs according to the embodiment of this invention. The processing is the same as that illustrated in FIG. 4 except for the processing in Step S207. Like processing are thus denoted by like numerals as of the processing illustrated in FIG. 4, and a description thereof is omitted.

A description is now given of the processing in Step S207. First, the user operates the display part 13 of the vehicle-onboard machine 10 at an arbitrary timing, thereby operating an application installed on the smartphone 20. Then, the user activates an operation log transmission part (not shown) included in an application installed on the smartphone 20. After the activation, the operation log transmission part collectively transmits the operation logs 205 stored in the storage apparatus 18 of the vehicle-onboard machine 10 and the operation logs 160 stored in the smartphone 20 to the log analysis server 33 in the data center 30.

For example, the operation log transmission part transmits, to the vehicle-onboard machine 10, a request for acquiring the operation logs 205 stored in the storage apparatus 18 of the vehicle-onboard machine 10 to control the vehicle-onboard machine 10 to transmit the operation logs 205, thereby acquiring the operation logs 205 of the vehicle-onboard machine 10. Then, the operation log transmission part collectively transmits the acquired operation logs 205 of the vehicle-onboard machine 10 and the operation logs 160 of the smartphone 20 to the log analysis server 33. The data center 30 receives the operation logs 205 and 160 transmitted by the smartphone 20, and, in Step S86, transmits a log reception response to the vehicle-onboard machine 10 and the smartphone 20.

In the above-mentioned embodiment, a description has been given of such an example that an application whose service is provided by the service provider server 31 is installed on the smartphone 20, and the application is operated by the vehicle-onboard machine 10. Next, referring to FIG. 17, a description is given of such an example that a program whose service is provided by the service provider server 31 is installed on the vehicle-onboard machine 10.

Figure 17:
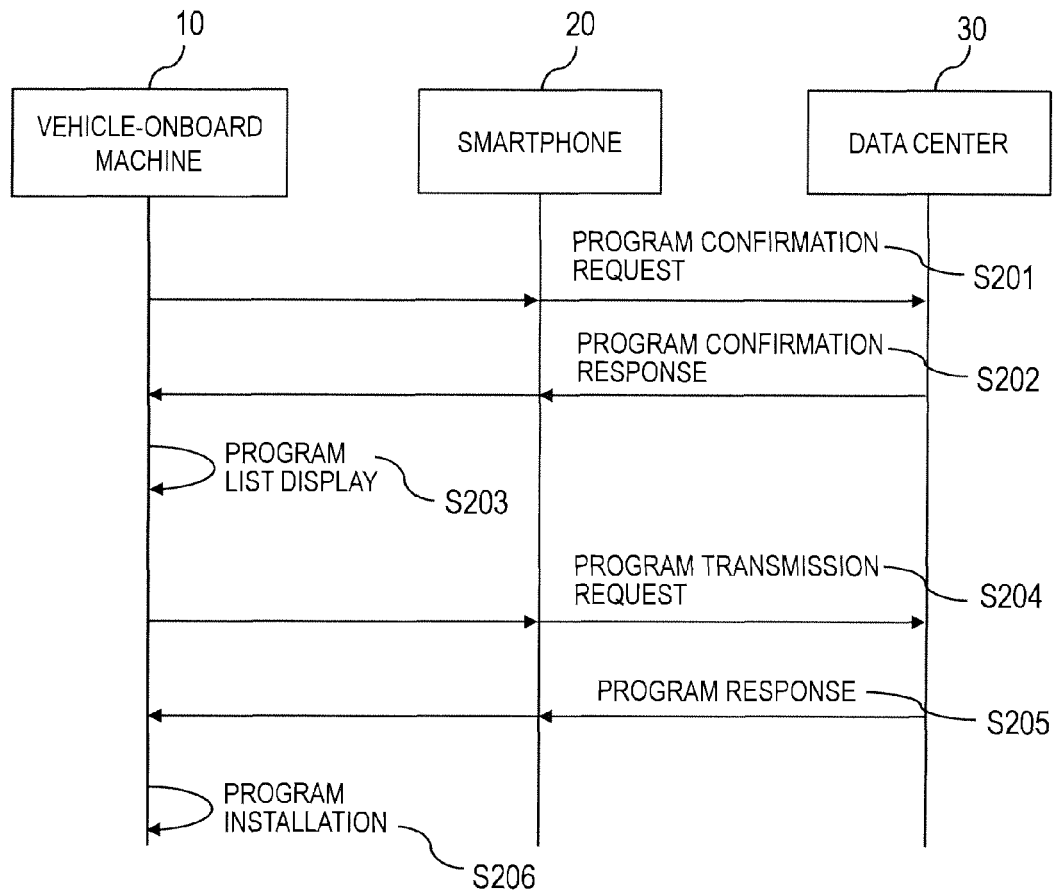

FIG. 17 is a sequence diagram illustrating the case where a program whose service is provided by the service provider server 31 is installed on the vehicle-onboard machine 10 according to the embodiment of this invention.

When the program is installed on the vehicle-onboard machine 10, which is different from the case where an application is installed on the smartphone 20, the program is not downloaded from the application provider server 40, but is downloaded on the vehicle-onboard machine 10 from a program provision server (not shown) provided in the data center 30.

First, when the vehicle-onboard machine 10 receives a predetermined operation from the user, the vehicle-onboard machine 10 transmits a program confirmation request for services provided by the data center 30 via the smartphone 20 to the program provision server (not shown) in the data center 30 (Step S201).

When the data center 30 receives the program confirmation request transmitted from the vehicle-onboard machine 10 by the processing in Step S201, the data center 30 transmits a list of programs which can be used on the vehicle-onboard machine 10 as a program confirmation response to the vehicle-onboard machine 10 (Step S202).

When the vehicle-onboard machine 10 receives the program confirmation response transmitted by the processing in Step S202, the vehicle-onboard machine 10 displays the list of programs which can be used on the display part 13 (Step S203).

When the vehicle-onboard machine 10 receives, from the user, an selection operation for a program to be used out of the program list displayed on the display part 13, the vehicle-onboard machine 10 transmits a transmission request for the program selected by the user (program transmission request) via the smartphone 20 to the program provision server (not shown) of the data center 30 (Step S204).

When the program provision server (not shown) of the data center 30 receives the program transmission request transmitted by the processing in Step S204, the program provision server transmits the program requested by the received program transmission request as a response to the vehicle-onboard machine 10 (Step S205).

When the vehicle-onboard machine 10 receives the program transmitted as the response by the processing in Step S205, the vehicle-onboard machine 10 installs the received program (Step S206).

Referring to FIG. 17, the program confirmation request has been described, but this configuration can be applied to a program update confirmation request which is a request for downloading an updated program, and the like.

In this way, when a program whose service is provided by the service provider server 31 is installed on the vehicle-onboard machine 10, the program may include the failure analysis program (corresponding to the failure analysis application 210), and the vehicle-onboard machine 10 may execute the failure analysis program.

It should be noted that this invention is not limited to the above-mentioned embodiments, and can include various variations. For example, the above-mentioned embodiments are detailed for the sake of easy understanding of the description, and this invention is not necessarily limited to a case including all the described configurations. Moreover, a part of a configuration of a certain embodiment can be replaced by a configuration of another embodiment, and a configuration of a certain embodiment can be added to a configuration of another embodiment. Moreover, in a part of the configuration of each of the embodiments, another component can be added, or the part can be deleted or replaced by another component.

Moreover, the respective configurations, functions, processing parts, processing means, and the like in part or entirety may be realized as hardware by designing those as integrated circuits. Moreover, the respective configurations, functions, and the like may be realized as software by a processor interpreting and executing programs realizing the respective functions. Information on programs, tables, files, and the like for realizing the respective functions may be stored in a recording device such as a memory, a hard disk, and a solid state drive (SSD), or a recording medium such as an IC card, an SD card, and a DVD.

What is claimed is:

1. A vehicle-onboard apparatus system, comprising a portable terminal and a vehicle-onboard machine that are configured to be coupled to each other for communication, wherein:

the portable terminal and the vehicle-onboard machine each store operation logs including operation contents thereof;

in a case where an operation of the vehicle-onboard machine and an operation of the portable terminal relate to each other, an operation log resulting from the operation of the vehicle-onboard machine and an operation log resulting from the operation of the portable terminal are associated with each other by first identification information;

in a case where the vehicle-onboard machine detects that one of coupling between the portable terminal and the vehicle-onboard machine and the vehicle-onboard machine enters a predetermined state, the vehicle-onboard machine is configured to present to a user the first identification information corresponding to an operation causing the detected predetermined state; and the portable terminal is configured to:

acquire, in a case where the portable terminal receives an input of the first identification information presented to the user, the operation log associated with the input first identification information out of the operation logs stored in the portable terminal;

analyze the acquired operation log, and store predetermined state reference information associating second identification information for identifying a type of the predetermined state and countermeasure information on a countermeasure corresponding to the predetermined state with each other;

in a case where the vehicle-onboard machine detects that one of the coupling between the portable terminal and the vehicle-onboard machine and the vehicle-onboard machine enters the predetermined state, the vehicle-onboard machine is configured to further present to the user the second identification information for identifying the type of the detected predetermined state, and the portable terminal is further configured to:

refer to, in a case where the portable terminal receives inputs of the first identification information and the second identification information, the predetermined state reference information, thereby acquiring the countermeasure information associated with identification information coincident with the input second identification information; and present the acquired countermeasure information to the user.

2. The vehicle-onboard apparatus system according to claim 1, wherein:

the operation log of the vehicle-onboard machine and the operation log of the portable terminal in a series of pieces of processing carried out by the vehicle-onboard machine and the portable terminal in cooperation with each other are associated with each other by the same first identification information; and the portable terminal is configured to:

acquire, in a case where the portable terminal receives the input of the first identification information presented to the user, the operation log associated with the input first identification information out of the operation logs stored in the portable terminal;

identify, by referring to the acquired operation log, to what extent the series of pieces of processing has been completed; and present the user with information indicating an extent to which the series of pieces of processing has been completed.

3. The vehicle-onboard apparatus system according to claim 1, further comprising a collection computer for collecting the operation log stored in the portable terminal, wherein:

the operation log of the vehicle-onboard machine and the operation log of the portable terminal in a series of pieces of processing carried out by the vehicle-onboard machine and the portable terminal in cooperation with each other are associated with each other by the same first identification information; and the portable terminal is configured to display a screen for enabling selection of at least one processing to be carried out out of processing of displaying the countermeasure information, processing of identifying to what extent the series of pieces of processing has been completed by referring to the acquired operation log, and processing of transmitting, to the collection computer, the input first identification information, the input second identification information, and the operation log stored in the portable terminal.

4. The vehicle-onboard apparatus system according to claim 1, further comprising a service provider computer for providing the vehicle-onboard machine with a service, wherein the vehicle-onboard machine is configured to:

transmit, in order to start provision of the service by the service provider computer, a service provision request via the portable terminal to the service provider computer;

generate, in a case where the service provision request is transmitted, a transaction identifier for uniquely identifying communication to/from the service provider computer; and use the generated transaction identifier as the first identification information until the provision of the service is finished.

5. The vehicle-onboard apparatus system according to claim 1, further comprising a service provider computer for providing a service, wherein:

the service provider computer provides the service for an application that is to be installed on the portable terminal; and the portable terminal analyzes the operation log stored in the portable terminal by a method different for each type of the application.

6. The vehicle-onboard apparatus system according to claim 1, wherein the portable terminal is configured to display a result of analysis on a display part of the portable terminal.

7. The vehicle-onboard apparatus system according to claim 1, further comprising a collection computer for collecting the operation log stored in the portable terminal, wherein the portable terminal is configured to transmit, to the collection computer, the input first identification information, the input second identification information, and the operation log stored in the portable terminal.

8. The vehicle-onboard apparatus system according to claim 1, wherein:

the vehicle-onboard machine is configured to display, in a case where the vehicle-onboard machine detects that one of the coupling between the portable terminal and the vehicle-onboard machine and the vehicle-onboard machine enters the predetermined state, the first identification information and the second identification information on a display part of the vehicle-onboard machine as a specific image readable by the portable terminal; and the portable terminal is configured to receive the inputs of the first identification information and the second identification information by reading the specific image.

9. A portable terminal, which is configured to be coupled to a vehicle-onboard machine for communication, wherein:

the portable terminal and the vehicle-onboard machine each store operation logs including operation contents thereof;

in a case where an operation of the vehicle-onboard machine and an operation of the portable terminal relate to each other, an operation log resulting from the operation of the vehicle-onboard machine and an operation log resulting from the operation of the portable terminal are associated with each other by first identification information; and the portable terminal is configured to:

acquire, in a case where the portable terminal receives an input of the first identification information that is presented to a user by the vehicle-onboard machine in a case where the vehicle-onboard machine detects that one of coupling between the portable terminal and the vehicle-onboard machine and the vehicle-onboard machine enters a predetermined state, the first identification information corresponding to an operation causing the detected predetermined state, the operation log associated with the input first identification information out of the operation logs stored in the portable terminal;

analyze the acquired operation log, and store predetermined state reference information associating second identification information for identifying a type of the predetermined state and countermeasure information on a countermeasure corresponding to the predetermined state with each other;

in a case where the vehicle-onboard machine detects that one of the coupling between the portable terminal and the vehicle-onboard machine and the vehicle-onboard machine enters the predetermined state, the vehicle-onboard machine is configured to further present to the user the second identification information for identifying the type of the detected predetermined state, and the portable terminal is further configured to:

refer to, in a case where the portable terminal receives inputs of the first identification information and the second identification information, the predetermined state reference information, thereby acquiring the countermeasure information associated with identification information coincident with the input second identification information; and present the acquired countermeasure information to the user.

10. A vehicle-onboard machine, which is configured to be coupled to a portable terminal for communication, wherein:

the portable terminal and the vehicle-onboard machine each store operation logs including operation contents thereof;

in a case where an operation of the vehicle-onboard machine and an operation of the portable terminal relate to each other, an operation log resulting from the operation of the vehicle-onboard machine and an operation log resulting from the operation of the portable terminal are associated with each other by first identification information;

in a case where the vehicle-onboard machine detects that one of a coupling between the portable terminal and the vehicle-onboard machine and the vehicle-onboard machine enters a predetermined state, the vehicle-onboard machine is configured to present to a user the first identification information so as to enable the portable terminal to analyze the operation log corresponding to an operation causing the detected predetermined state as a result of an input of the first identification information corresponding to the operation causing the detected predetermined state to the portable terminal;

the portable terminal is configured to acquire, in a case where the portable terminal receives the input of the first identification information presented to the user, the operation log associated with the input first identification information out of the operation logs stored in the portable terminal; and the portable terminal is configured to analyze the acquired operation log, and store predetermined state reference information associating second identification information for identifying a type of the predetermined state and countermeasure information on a countermeasure corresponding to the predetermined state with each other;

in a case where the vehicle-onboard machine detects that one of the coupling between the portable terminal and the vehicle-onboard machine and the vehicle-onboard machine enters the predetermined state, the vehicle-onboard machine is configured to further present to the user the second identification information for identifying the type of the detected predetermined state, and the portable terminal is further configured to:

refer to, in a case where the portable terminal receives inputs of the first identification information and the second identification information, the predetermined state reference information, thereby acquiring the countermeasure information associated with identification information coincident with the input second identification information; and present the acquired countermeasure information to the user.

* * * * *